US009738845B2

(12) United States Patent
Gibbel

(10) Patent No.: US 9,738,845 B2
(45) Date of Patent: Aug. 22, 2017

(54) COMBUSTIBLE PELLET DRYING SYSTEM

(71) Applicant: OMNIS THERMAL TECHNOLOGIES, LLC, Santa Barbara, CA (US)

(72) Inventor: David S. Gibbel, Falls City, OR (US)

(73) Assignee: OMNIS THERMAL TECHNOLOGIES, LLC, Lexington, KY (US)

( * ) Notice: Subject to any disclaimer, the term of this patent is extended or adjusted under 35 U.S.C. 154(b) by 28 days.

(21) Appl. No.: 14/857,450

(22) Filed: Sep. 17, 2015

(65) Prior Publication Data

US 2017/0081605 A1   Mar. 23, 2017

(51) Int. Cl.
| C10L 5/28 | (2006.01) |
| C10L 9/08 | (2006.01) |
| C10L 5/04 | (2006.01) |
| F26B 3/14 | (2006.01) |
| F26B 9/06 | (2006.01) |
| F26B 17/12 | (2006.01) |

(52) U.S. Cl.
CPC .................. *C10L 9/08* (2013.01); *C10L 5/04* (2013.01); *F26B 3/14* (2013.01); *F26B 9/06* (2013.01); *F26B 17/128* (2013.01); *C10L 2290/06* (2013.01); *C10L 2290/08* (2013.01); *C10L 2290/56* (2013.01); *C10L 2290/60* (2013.01)

(58) Field of Classification Search
CPC ........... C10L 2290/08; C10L 5/00; C10L 5/28
USPC .................................................... 44/626, 629
See application file for complete search history.

(56) References Cited

U.S. PATENT DOCUMENTS

| 3,655,350 | A |   | 4/1972 | Utley |
| 4,974,336 | A |   | 12/1990 | Hahn |
| 5,092,766 | A | * | 3/1992 | Kubotani .............. F26B 23/026 |
|           |   |   |        | 34/516 |
| 5,123,835 | A | * | 6/1992 | Richards ................. F23C 15/00 |
|           |   |   |        | 122/24 |
| 5,487,225 | A |   | 1/1996 | Downie |
| 7,024,796 | B2 | * | 4/2006 | Carin ........................ C05F 3/00 |
|           |   |   |        | 34/363 |

(Continued)

FOREIGN PATENT DOCUMENTS

CN            101307372 A      11/2008

*Primary Examiner* — Ellen McAvoy
(74) *Attorney, Agent, or Firm* — Kirton McConkie; Evan R. Witt

(57) ABSTRACT

A combustible pellet drying system includes a valveless pulse combustor and a drying column. The drying column includes a first drying region and optionally a second drying region. The first drying region receives heated drying gas from the pulse combustor to dry a quantity of moist pellets flowing downwardly through the drying column. Moisture-laden exhaust gas from the first drying region is processed by a condenser to remove water and recover thermal energy therefrom, and to produce a cooled dried exhaust gas which may be reheated by passing through a jacket around the pulse combustor. The reheated dry gas is introduced into the second drying region to further dry the pellets. The second drying region is preferably a downwardly expanding cone configuration. The drying column includes a plurality of temperature sensors. Adjacent temperature sensors may be used to determine a level of pellets within the drying column. The combustible pellets are preferably coal pellets.

26 Claims, 3 Drawing Sheets

(56) References Cited

U.S. PATENT DOCUMENTS

| | | | | |
|---|---|---|---|---|
| 7,024,800 B2* | 4/2006 | Gorbell | ............... | F26B 19/005 |
| | | | | 34/576 |
| 7,610,692 B2* | 11/2009 | Carin | ............... | F26B 23/022 |
| | | | | 34/388 |
| 7,685,737 B2* | 3/2010 | Gorbell | ............... | F26B 19/005 |
| | | | | 210/788 |
| 8,197,561 B2* | 6/2012 | Dunlop | ............... | C10L 5/04 |
| | | | | 44/620 |
| 8,753,410 B2* | 6/2014 | Taulbee | ............... | C10L 5/04 |
| | | | | 44/550 |
| 8,997,376 B2* | 4/2015 | Carnegie | ............... | F26B 17/14 |
| | | | | 201/29 |
| 2006/0101881 A1* | 5/2006 | Carin | ............... | C05F 3/00 |
| | | | | 71/21 |
| 2010/0287826 A1* | 11/2010 | Hoffman | ............... | C10L 5/363 |
| | | | | 44/605 |
| 2010/0300368 A1* | 12/2010 | Myers | ............... | A01K 1/0154 |
| | | | | 119/171 |
| 2011/0197501 A1* | 8/2011 | Taulbee | ............... | C10L 5/04 |
| | | | | 44/553 |
| 2012/0272569 A1* | 11/2012 | Dunlop | ............... | C10L 5/04 |
| | | | | 44/626 |
| 2014/0144072 A1* | 5/2014 | Bland | ............... | C10B 57/10 |
| | | | | 44/626 |

* cited by examiner

COMBUSTIBLE PELLET DRYING SYSTEM

BACKGROUND OF THE INVENTION

This disclosure relates to systems and methods for drying combustible pellets, such as pellets comprising coal particles, which provide efficient drying and maintain the integrity of the combustible pellets. The disclosed pellet drying system utilizes a valveless pulse combustor.

BACKGROUND

A need exists for an effective method of drying pelletized combustible materials such as pelletized coal, solid carbon fuel, and other solid fuel feedstocks. Conventional state-of-the-art dryers, such as rotary drum and fluidized bed dryers, typically permit or induce significant amounts of relative motion between pellets that can cause pellet degradation and dust formation. Coal dust is explosive and difficult to contain. Hence, there is a need for a dryer that limits relative motion of the combustible pellets being dried to thereby limit pellet degradation and dust formation.

Conventional dryers, such as a fluidized bed, typically need to be indirectly-fired and provided with a secondary gas supply (such as $N_2$) to permit drying in an inert or low-oxygen environment that will not ignite or permit ignition of pellets being dried.

Combustible pellets, such as pelletized coal particles, typically have an initial moisture content of about 20-30% by weight. It is desirable to dry the pellets to a final moisture content of about 2% by weight.

It would be a significant advancement in the art to provide an efficient system and method for drying combustible pellets. It would be a further advancement to provide a drying process that limits pellet degradation and combustible dust formation.

BRIEF SUMMARY OF THE INVENTION

This disclosure relates to systems and methods for drying combustible pellets. The disclosed systems and methods are particularly adapted to, but are not limited to, drying coal pellets.

One non-limiting pellet drying system includes a valveless pulse combustor to provide a source of heated drying gas. The heated drying gas is directed to a drying column. The drying column includes a first drying region containing a gas inlet and a gas outlet. The gas inlet receives heated drying gas and the gas outlet exhausts moisture-laden exhaust gas. An airlock opening is disposed at a top portion of the first drying region through which moist pellets are introduced into the first drying region to form a bed of moist pellets within the first drying region. A gate valve exit is disposed at a bottom portion of the first drying region through which dried or partially dried pellets exit the first drying region.

The valveless pulse combustor not only provides heated drying gas, but it also produces a sonic energy source in the form of pressure pulses. The use of pulse combustion heat enhances the rate of drying, which is of particular importance in drying pelletized material having a high moisture diffusion barrier within the pellet. Pulse combustion permits drying at rates 200-300% higher than conventional steady-state drying technologies. Pulse combustion also reduces the total volume of air discharged to the atmosphere, since valveless pulse combustors may operate at an equivalence ratio near or at 1.0.

Yet another advantage of using a valveless pulse combustor is the ability to combust finely-divided solid fuels, either alone or suspended in a carrier fluid. Thus, the valveless pulse combustor dryer can operate using a low-cost fuel source such as powdered coal. The powdered coal may be suspended in a carrier fluid. The carrier fluid may be inert or reactive. The carrier fluid may be liquid or gas. The carrier fluid may optionally be a fuel source itself. The carrier fluid may optionally contain an oxidizing agent.

The heated drying gas is preferably directed to the drying column in the same direction as the moist combustible pellets. Thus, the drying system is operated as a concurrent flow or co-flow system rather than the more conventional counter-flow drying system. As a result, the drying pellets do not overheat.

Because the drying pellets travel en masse through the drying column, with almost zero relative motion between adjacent pellets, the disclosed drying system does not cause pellet degradation and combustible dust formation to the extent seen with conventional dryers.

In one non-limiting embodiment, the disclosed pellet drying system may further include a gas-gas condensing heat exchanger. The condensing heat exchanger receives the moisture-laden exhaust gas, which is preferably at or near moisture saturation, and extracts both latent and sensible heat by condensing water vapor from the exhaust gas to produce a cooled dried exhaust gas. The heat exchange medium may be ambient air, and the low-temperature energy recovered may be used to pre-dry and condition, or harden, the moist pellets coming from a pellet extruder, prior to entry into the system for drying combustible pellets.

In one non-limiting embodiment, the valveless pulse combustor includes an air-cooled jacket having a jacket inlet and a jacket outlet. The jacket inlet receives the cooled dried exhaust gas and the jacket outlet exits reheated dry gas. The reheated dry gas may have a temperature in the range from about 250° C. to about 350° C. To make efficient use of the reheated dry gas, the drying column further includes a second drying region containing a gas inlet and a gas outlet. The gas inlet receives the reheated dry exhaust gas and the gas outlet exits system exhaust gas. The second drying region includes a pellet opening to receive partially dried pellets from the first drying region and a dried pellet exit.

In one non-limiting embodiment, the first drying region includes a downwardly expanding cone configuration. Similarly, in one non-limiting embodiment, the second drying region includes a downwardly expanding cone configuration. An expanding or flared column configuration facilitates gravity flow of the drying and dried pellets through the system, particularly at the gate valve exit from the first drying region and at the dried pellet exit from the second drying region. For ease of manufacture, the entire drying column, including first and second drying regions, may have a downwardly expanding cone configuration.

In one non-limiting embodiment, the pellet drying system includes a cyclone dust collector to receive and process system exhaust gas. There may also be an optional stack silencer to minimize noise. There may be an optional wet scrubber to remove particulates from the system exhaust gas.

The valveless pulse combustor may be operated in a combustion-air only mode, such that it does not require a large percentage of excess oxygen, as is the case with steady state combustors. This allows the combustible pellets to be dried by exposure to heated drying gas containing less than 5% by volume oxygen, which is too low to permit combustion or ignition of coal dust or fine particles. It is desirable to have low oxygen content to prevent unintended oxidation or combustion of the pellets. In one non-limiting embodiment, the heated drying gas has a temperature of about 700° C.±50° C.

The drying column preferably comprises a plurality of temperature sensors to monitor the temperature at various locations within the drying column. Temperature sensors may also be provided at other locations within the system for drying combustible pellets. For instance, inlet and outlet temperatures may be monitored in relation to the condenser to facilitate proper condenser operation. Similarly, inlet and outlet temperatures may be monitored in relation to the valveless pulse combustor to facilitate its proper operation.

In one non-limiting embodiment, vertically spaced adjacent temperature sensors within the drying column may be used to determine a level of pellets within the drying column.

Other sensors may be advantageously used in the system for drying combustible pellets. For example, moisture level sensors may be used to measure the moisture content of various gas streams. Oxygen level sensors may be used to measure the oxygen content of various gas streams.

In one non-limiting embodiment the bed of moist pellets within the first drying region has a pellet bed height and a pellet bed diameter, wherein the pellet bed height is at least two times the pellet bed diameter.

One non-limiting combustible pellet drying method includes the steps of operating a valveless pulse combustor to provide a source of heated drying gas, introducing moist combustible pellets into a first drying region of a drying column, and passing the heated drying gas through the first drying region to contact and dry the combustible pellets and to product moisture-laden exhaust gas.

The combustible pellet drying method may optionally include the step of passing the moisture-laden exhaust gas through a condenser to remove water from the exhaust gas to produce a cooled dried exhaust gas.

The combustible pellet drying method may optionally include the step of reheating the cooled dried exhaust gas by passing the cooled dried exhaust gas through an air-cooled jacket of the valveless pulse combustor to produce reheated dry gas.

The combustible pellet drying method may optionally include the steps of moving pellets from the first drying region to a second drying region of the drying column and passing the reheated dry gas through the second drying region to further dry the combustible pellets.

The combustible pellet drying method may optionally include the steps of monitoring a temperature at a plurality of locations within the drying column and determining a level of pellets within the drying column based upon monitored temperature differences.

The combustible pellet drying method may further include passing system exhaust gas from the drying column to a cyclone dust collector to capture fine particles having a size in the range from 20 μm to 3 mm. The method may also include passing system exhaust gas from the drying column to a wet scrubber.

To avoid unintended oxidation or combustion of the combustible pellets, the heated drying gas preferably has a low oxygen composition, such as less than about 5% by volume oxygen. The heated drying gas may have a temperature of about 700° C.±50° C. The reheated dry gas may have a temperature in the range from about 250° C. to about 350° C.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the invention is not intended to limit the scope of the invention, as claimed, but is merely representative of present embodiments of the invention.

Figure 1:
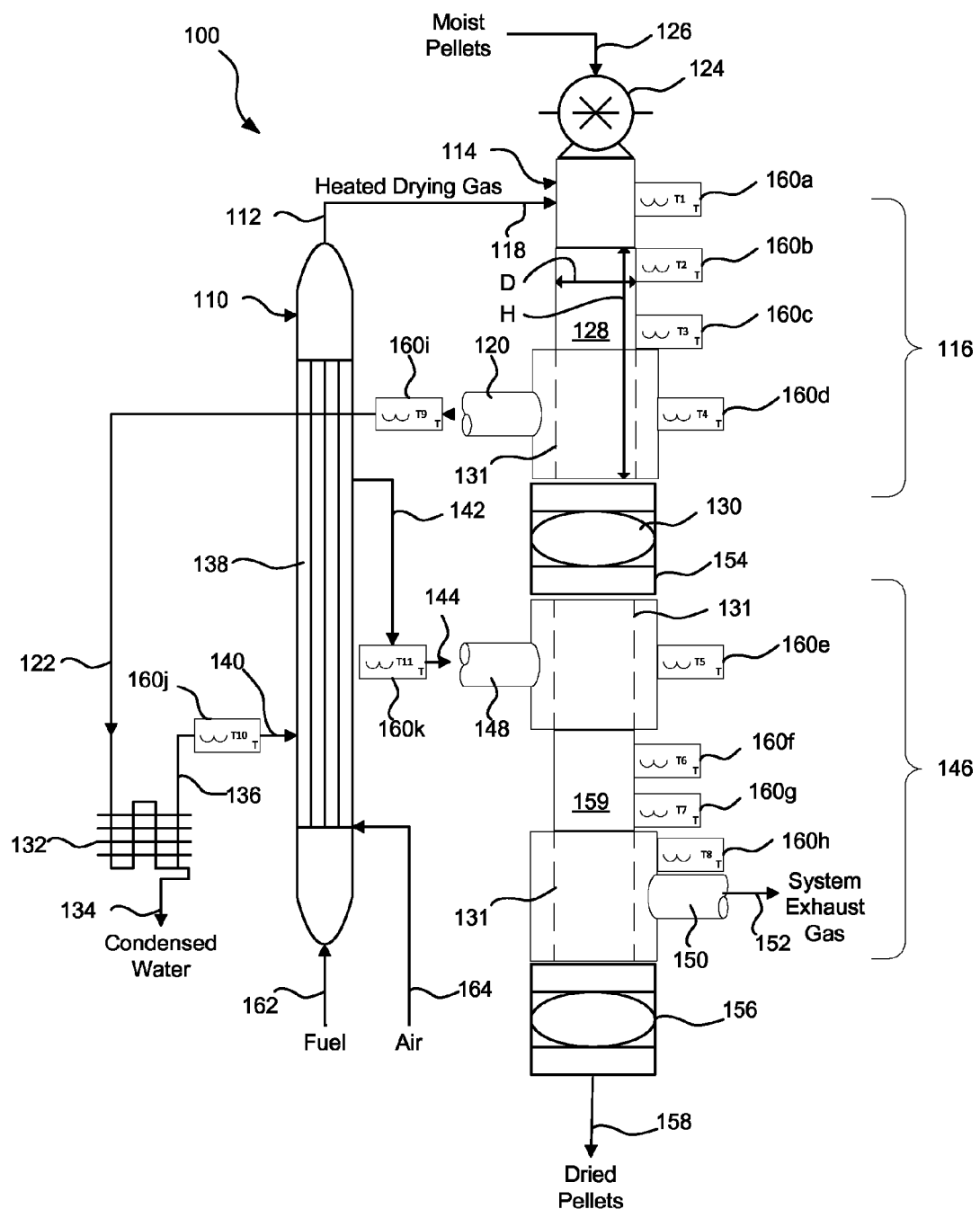
FIG. 1 shows a process flow diagram for a system for drying coal pellets.

Reference is made to FIG. 1, which illustrates a process flow diagram for a system for drying combustible pellets 100, such as coal pellets. The disclosed pellet drying system includes a valveless pulse combustor 110 to provide a source of heated drying gas 112. The heated drying gas is directed to a drying column 114. The drying column includes a first drying region 116 containing a gas inlet 118 and a gas outlet 120. The gas inlet receives heated drying gas 112 and the gas outlet exits moisture-laden exhaust gas 122. An airlock opening 124 is disposed at a top portion of the first drying region 116 through which moist pellets 126 are introduced into the first drying region to form a bed of moist pellets 128 within the first drying region 116. A gate valve exit 130 is disposed at a bottom portion of the first drying region through which dried or partially dried pellets exit the first drying region 116. In one embodiment, the moist pellets are compressed or extruded coal pellets having an approximate diameter of about 10 mm and an approximate length of about 15 mm.

To enable the moisture-laden exhaust gas 122 to exit the bed of moist pellets 128, the peripheral wall of the drying column in the vicinity of the gas exit 120 contains perforations 131. To prevent unintended clogging of the perforations 131 by the drying pellets, the perforations 131 preferably have an elongated shape, and the elongated shape is preferably oriented in a vertical direction. To provide an effective flow of heated drying gas 112 through the bed of moist pellets 128, the bed should have an aspect ratio of height (H) to diameter (D) of at least 1.5:1. In some embodiments, the aspect ratio of H:D is at least 2:1.

The disclosed pellet drying system 100 may further include a condensing heat exchanger or condenser 132. The condenser receives the moisture-laden exhaust gas 122 and extracts both latent and sensible heat by condensing water vapor from the moisture-laden exhaust gas 122 to produce condensed water 134 and a cooled dried exhaust gas 136. The moisture-laden exhaust gas 122 is preferably at or near moisture saturation. In one non-limiting embodiment, the condenser 132 is an air-cooled condenser although other types of condensers may be used herein. The low-temperature energy recovered from the condenser may be used to pre-dry and condition, or harden, the moist pellets prior to entry into the system for drying combustible pellets 100. To facilitate efficient operation of the air-cooled condenser, a blower (not shown) may provide a source of cooling air to the condenser. Suitable temperature, pressure, and flowrate sensors may be coupled to process control software and hardware to facilitate efficient operation and control of the condenser. The latent and sensible heat energy recovered from the condensing water vapor is transferred to the cooling air heat transfer medium. This heated, dry air may be used to pre-dry and condition pellets exiting the pellet extruder and prior to entry into the drying tower.

The condensing heat exchanger receives the moisture-laden exhaust gas, which is preferably at or near moisture saturation, and extracts both latent and sensible heat by condensing water vapor from the exhaust gas to produce a cooled dried exhaust gas. The heat exchange medium may be ambient air, and the low-temp energy recovered may be used to pre-dry and condition, or harden, the pellets coming from the extruder, prior to entry into the coal pellet dryer The disclosed valveless pulse combustor 110 includes an air-cooled jacket 138 having a jacket inlet 140 and a jacket outlet 142. The jacket inlet 140 receives the cooled dried exhaust gas 136 and the jacket outlet exits reheated dry gas 144. The reheated dry gas may have a temperature in the range from about 250° C. to about 350° C.

To make efficient use of the reheated dry gas, the drying column further includes a second drying region 146 containing a gas inlet 148 and a gas outlet 150. The gas inlet 148 receives the reheated dry exhaust gas 144 and the gas outlet 150 exits system exhaust gas 152. The second drying region 146 includes a pellet opening 154 to receive partially dried pellets from the first drying region 116 and a dried pellet exit 156 from which dried pellets 158 exit the second drying region 146 of the drying column 114.

A bed of drying pellets 159 is formed within the second drying region 146 in a manner similar to the bed of moist pellets 128 within the first drying region 116. To provide an effective flow of reheated dry gas 144 through the bed of drying pellets 159, the bed should have an aspect ratio of height (H) to width (D) of at least 1.5:1. In some embodiments, the aspect ratio of H:D is at least 2:1. To enable the reheated dry gas 144 to enter the second drying region 146 and to enable the system exhaust gas 152 to exit the second drying region 146, the peripheral wall of the drying column in the vicinity of the gas inlet 148 and the gas exit 150 contains perforations 131, as described above.

Because the drying pellets travel en masse through the drying column 114, with almost zero relative motion between adjacent pellets, the disclosed drying system does not cause pellet degradation and combustible dust formation to the extent seen with conventional dryers.

The heated drying gas 112 is preferably directed to the drying column in the same direction as the drying pellets. Thus, the drying system is operated as a concurrent flow or co-current flow system rather than the more conventional counter-current flow drying system. In the disclosed co-current flow drying system, the hottest drying gas contacts the wettest pellets, which are most capable of withstanding the high drying temperature.

It is observed that during the drying process, moist pellets experience a substantially constant drying rate during the initial stage of drying, such as the drying that occurs in the first drying region. In this stage, there is high water diffusion from the interior of the pellet to the pellet surface, such that the water diffusion rate does not limit the overall pellet drying rate. As the moisture content of the pellet decreases to about 5% by weight, the drying rate changes from a substantially constant rate to a falling rate. In this stage, between about 5% and about 2% by weight moisture content, the drying rate is constantly decreasing. This falling drying rate is caused by a falling water diffusion rate from the interior of the pellet to the pellet surface. The falling drying rate occurs in the second drying region. It is important as the pellet approaches the desired drying level, to not subject the pellet to high temperatures that could unintentionally oxidize or degrade the pellets. For this reason it is desirable to dry the pellets in the second drying region at lower temperature and at a longer residence time to accommodate the lower water diffusion rate within the pellet.

The pellet drying system 100 preferably comprises a plurality of temperature sensors 160a-160k to monitor the temperature at various locations within the pellet drying system. Temperature sensors 160a-160h monitor temperature a various locations within the drying column 114. Temperature sensors 160i-160k are provided at other locations within the system for drying combustible pellets. For instance, sensors 160i and 160j may monitor inlet and outlet temperatures in relation to the condenser 132 to facilitate proper condenser operation. Similarly, inlet and outlet temperatures may be monitored in relation to the valveless pulse combustor 110 to facilitate its proper operation.

In one non-limiting embodiment, vertically spaced adjacent temperature sensors 160a and 160b within the drying column 114 may be used to determine a level of pellets within the drying column. For example, temperature sensor 160a may measure a temperature of approximately 700° C. which may be the temperature of the heated drying gas, indicating that there are no drying pellets in the vicinity of sensor 160a, whereas temperature sensor 160b may measure a temperature of approximately 90° C. which may be the temperature of moist pellets undergoing drying, indicating that drying pellets are in the vicinity of sensor 160b. Thus, the temperature difference between sensor 160a and 160b indicates the approximate level of pellets within the drying column.

Other sensors (not shown) may be advantageously used in the system for drying combustible pellets 100. For example, moisture level sensors may be used to measure the moisture content of various gas streams. Oxygen level sensors may be used to measure the oxygen content of various gas streams. Pressure sensors may be used to monitor pressures of the various gas streams used in the system. In addition, flowmeters for gas streams, the fuel stream, and product streams may be included in the system.

The valveless pulse combustor 110 not only provides heated drying gas 112, but it does so in a high amplitude oscillating wave form with pressure waves cycling both above and below ambient pressure. These oscillating pressure pulses enhance the rate of drying, which is of particular importance in drying pelletized material having a high moisture diffusion barrier within the pellet. Various valveless pulse combustors are known and commercially available. The valveless pulse combustor will typically operate according to the principles disclosed in U.S. Pat. No. 3,462,955 to Lockwood. In one non-limiting embodiment, the valveless pulse combustor has a linear shape instead of the U-shaped configuration disclosed by Lockwood.

Pulse combustion permits drying at rates 200-300% higher than conventional steady-state drying technologies. Without being bound by theory, the improved drying rate using pulse combustion results from oscillating shock waves and pressure reversals which enhance heat transfer and moisture removal compared to conventional steady state combustion. A typical operating pulse frequency may range from about 15 Hz to about 350 Hz. In one embodiment, the operating pulse frequency is about 90±5 Hz.

The valveless pulse combustor may be operated in a combustion-air only mode, such that it does not require a large percentage of excess oxygen, as is the case in steady state combustors. This allows the combustible pellets to be dried by exposure to heated drying gas containing less than 5% by volume oxygen, which is too low to permit combustion or ignition of coal dust or fine particles. In some embodiments, the heated drying gas contains less than 4% by volume oxygen. It is desirable to dry the combustible pellets in a low oxygen environment to prevent unintended oxidation or combustion of the pellets. The disclosed valveless pulse combustion also reduces the total volume of air discharged to the atmosphere, since valveless pulse combustors operate at an equivalence ratio near or at 1.0.

The valveless pulse combustor requires a fuel source 162 and an oxygen or air source 164. Yet another advantage of using a valveless pulse combustor is the ability to combust finely-divided solid fuels, either alone or suspended in a carrier fluid. Thus, the valveless pulse combustor dryer can operate using a low-cost fuel source such as powdered coal. The powdered coal may be suspended in a carrier fluid. The carrier fluid may be inert or reactive. The carrier fluid may be liquid or gas. One possible carrier fluid is water. The carrier fluid may optionally be a fuel source itself, such as natural gas, diesel, or another combustible liquid or gaseous fuel. The carrier fluid may optionally contain an oxidizing agent, such as air or oxygen.

In one non-limiting embodiment, the heated drying gas has a temperature of about 700° C.±50° C.

Figure 2:
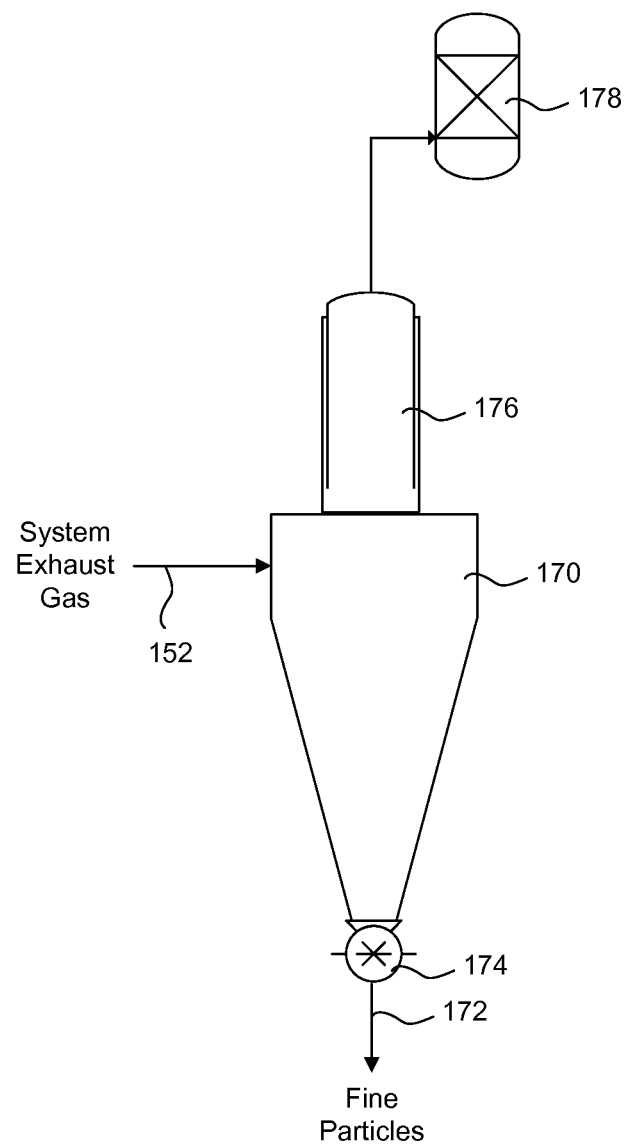
FIG. 2 shows additional optional equipment for processing the system exhaust gas.

In one non-limiting embodiment shown in FIG. 2, the combustible pellet drying system 100 includes a cyclone dust collector 170 to receive and process system exhaust gas 152. The cyclone dust collector 170 is designed and configured to capture and remove fine particles, including coal fines, typically in the range from about 20 μm to about 3 mm. In some embodiments, the cyclone dust collector may capture fine particles as small as 10 μm with an efficiency of 99.9%. The captured fine particles 172 are discharged through an airlock 174. There may also be an optional stack silencer 176 to minimize noise. There may be an optional wet scrubber 178 to remove fine particulates having a size less than about 10 μm to 20 μm from the system exhaust gas 152.

Figure 3:
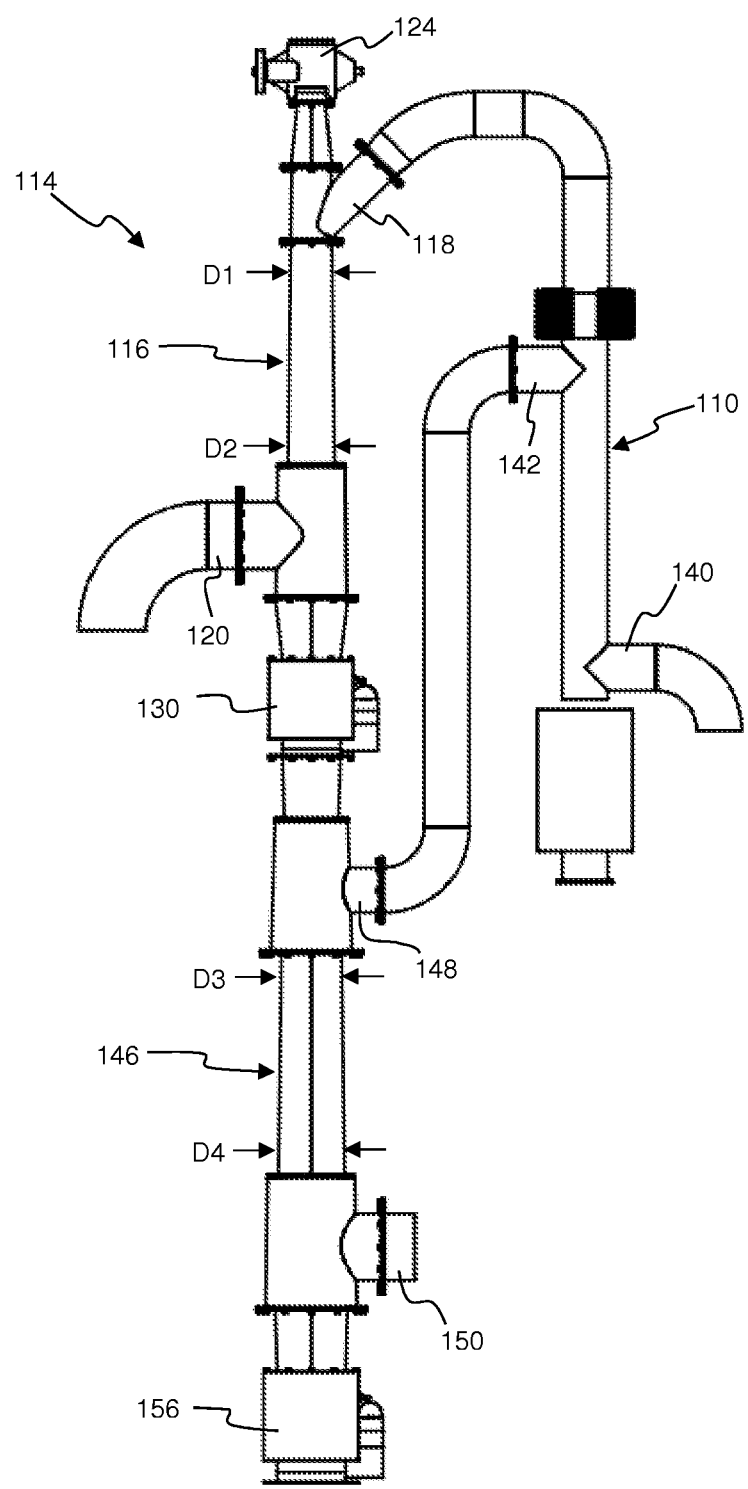
FIG. 3 shows a more detailed illustration of the valveless pulse combustor and the drying column.

FIG. 3 discloses a more detailed illustration of certain elements of the disclosed invention. The same reference numbers used in FIG. 1 are used in FIG. 3. The first drying region 116 includes a downwardly expanding cone configuration. That is, the diameter D1 at an upper portion of the first drying region is smaller than the diameter D2 at a bottom portion of the first drying region. Similarly, in one non-limiting embodiment, the second drying region 146 includes a downwardly expanding cone configuration. That is, the diameter D3 at an upper portion of the second drying region is smaller than the diameter D4 at a bottom portion of the second drying region.

An expanding or flared column configuration facilitates gravity flow of the drying and dried pellets through the system, particularly at the gate valve exit 130 from the first drying region 116 and at the dried pellet exit 156 from the second drying region 146. Without an outward expanding taper configuration, there is a likelihood the drying pellets will interact which each other and cause bridging that inhibits the free gravity flow of the pellets through the drying column. It is observed that a 1° included angle, outward taper is sufficient to prevent bridging between the drying pellets. Therefore, it is currently preferred to configure the drying column with an outward taper ranging from about 1° to about 5° included angle. For ease of manufacture, the entire drying column, including first and second drying regions, may have the same a downwardly expanding taper configuration. It is, however, within the scope of the invention to fabricate the drying column having differing taper angles. It is also within the scope of the invention to fabricate the drying column containing portions of the drying column without a taper.

Another significant advantage of fabricating the drying column with a downwardly expanding taper configuration is that such a configuration enables the residence time of the drying pellets at any given vertical position in the drying column to increase as the pellets progress downwardly through the drying column. In other words, the drying pellets have a longer residence time within the second drying region compared to the first drying region because the second drying region has a larger diameter (and corresponding larger volume) compared to the first drying region. The variable residence time also means that the drying pellets are subjected to a longer exposure time to the cooler drying air. This is particularly advantageous in the second drying region where there the drying rate is decreasing, thereby requiring a longer drying time to account for the slower water diffusion rate in the pellets.

From the foregoing description, it will be appreciated that the disclosed invention provides an efficient system and method for drying combustible pellets. The disclosed invention further provides a drying process that limits pellet degradation and combustible dust formation.

The described embodiments and examples are all to be considered in every respect as illustrative only, and not as being restrictive. The scope of the invention is, therefore, indicated by the appended claims, rather than by the foregoing description. All changes that come within the meaning and range of equivalency of the claims are to be embraced within their scope.

The invention claimed is:
1. A pellet drying system comprising:
  a valveless pulse combustor to provide a source of heated drying gas, wherein the heated drying gas has a composition comprising less than about 5% by volume oxygen; and
  a drying column comprising:
    a first drying region containing a gas inlet and a gas outlet, wherein the gas inlet receives heated drying gas and the gas outlet exits moisture-laden exhaust gas;
    an airlock opening at a top portion of the first drying region through which moist pellets are introduced into the first drying region to form a bed of moist pellets within the first drying region; and a gate valve exit at a bottom portion of the first drying region through which dried or partially dried pellets exit the first drying region.

2. The pellet drying system according to claim 1, further comprising a condenser that receives the moisture-laden exhaust gas and condenses water from the exhaust gas to produce a cooled dried exhaust gas, and to recover the latent and sensible heat energy therefrom.

3. The pellet drying system according to claim 1, wherein the moisture-laden exhaust gas is at or near moisture saturation.

4. The pellet drying system according to claim 2, wherein the valveless pulse combustor comprises an air-cooled jacket having a jacket inlet and a jacket outlet, wherein the jacket inlet receives the cooled dried exhaust gas and the jacket outlet exits reheated dry gas.

5. The pellet drying system according to claim 4, wherein the drying column further comprises a second drying region containing a gas inlet and a gas outlet, wherein the gas inlet receives the reheated dry exhaust gas and the gas outlet exits system exhaust gas.

6. The pellet drying system according to claim 5, wherein the second drying region comprises a pellet opening to receive partially dried pellets from the first drying region and a dried pellet exit.

7. The pellet drying system according to claim 5, wherein the second drying region comprises a downwardly expanding cone configuration.

8. The pellet drying system according to claim 1, further comprising a cyclone dust collector to receive and process system exhaust gas.

9. The pellet drying system according to claim 1, further comprising a wet scrubber to receive and process system exhaust gas.

10. The pellet drying system according to claim 1, wherein the heated drying gas has a temperature of about 700° C.±50° C.

11. The pellet drying system according to claim 1, wherein the reheated dry gas has a temperature in the range from about 250° C. to about 350° C.

12. The pellet drying system according to claim 1, wherein the drying column comprises a plurality of temperature sensors.

13. The pellet drying system according to claim 12, wherein adjacent temperature sensors determine a level of pellets within the drying column.

14. The pellet drying system according to claim 1, wherein the bed of moist pellets within the first drying region has a pellet bed height and a pellet bed diameter, wherein the pellet bed height is at least two times the pellet bed diameter.

15. The pellet drying system according to claim 1, wherein the pellets are coal pellets.

16. The pellet drying system according to claim 1, wherein the valveless pulse combustor is operated in a combustion air only mode to produce heated drying gas containing less than 5 percent residual oxygen.

17. A method for drying combustible pellets comprising:
operating a valveless pulse combustor to provide a source of heated drying gas, wherein the heated drying gas has a composition comprising less than 5% by volume oxygen;
introducing moist combustible pellets into a first drying region of a drying column; and
passing the heated drying gas through the first drying region to contact and dry the combustible pellets and to produce moisture-laden exhaust gas.

18. The method for drying combustible pellets according to claim 17, further comprising:
monitoring a temperature at a plurality of locations within the drying column; and
determining a level of pellets within the drying column based upon monitored temperature differences.

19. The method for drying combustible pellets according to claim 17, further comprising passing the moisture-laden exhaust gas through a condenser to remove water from the exhaust gas to produce a cooled dried exhaust gas.

20. The method for drying combustible pellets according to claim 19, further comprising reheating the cooled dried exhaust gas by passing the cooled dried exhaust gas through an air-cooled jacket of the valveless pulse combustor to produce reheated dry gas.

21. The method for drying combustible pellets according to claim 19, further comprising:
moving pellets from the first drying region to a second drying region of the drying column; and
passing the reheated dry gas through the second drying region to further dry the combustible pellets.

22. The method for drying combustible pellets according to claim 21, wherein the second drying region comprises a downwardly expanding cone configuration.

23. The method for drying combustible pellets according to claim 17, further comprising passing system exhaust gas from the drying column to a cyclone dust collector to capture fine particles having a size in the range from 20 µm to 3 mm.

24. The method for drying combustible pellets according to claim 17, further comprising passing system exhaust gas from the drying column to a wet scrubber.

25. The method for drying combustible pellets according to claim 17, wherein the heated drying gas has a temperature of about 700° C.±50° C.

26. The method for drying combustible pellets according to claim 20, wherein the reheated dry gas has a temperature in the range from about 250° C. to about 350° C.

* * * * *